United States Patent [19]

Donohue

[11] 4,172,775

[45] Oct. 30, 1979

[54] PHOTOCHEMICAL SEPARATION OF METALS IN SOLUTION BY PRECIPITATION FOLLOWING REDUCTION OR OXIDATION

[75] Inventor: Terence Donohue, Alexandria, Va.

[73] Assignee: The United States of America as represented by the Secretary of the Navy, Washington, D.C.

[21] Appl. No.: 876,297

[22] Filed: Feb. 9, 1978

[51] Int. Cl.$^2$ .............................................. B01J 1/10
[52] U.S. Cl. .................... 204/157.1 R; 204/DIG. 11
[58] Field of Search ................. 204/157.1 R, DIG. 11

[56] References Cited

U.S. PATENT DOCUMENTS

| 3,923,619 | 12/1975 | DePoorter et al. | 204/DIG. 11 |
| 4,131,527 | 12/1978 | Friedman et al. | 204/157.1 R |

OTHER PUBLICATIONS

Anschel, IBM Technical Disclosure Bulletin, (Jul. 1972), vol. 15, No. 2, pp. 603–604.

*Primary Examiner*—Howard S. Williams
*Attorney, Agent, or Firm*—R. S. Sciascia; Philip Schneider; Thomas McDonnell

[57] ABSTRACT

Mixtures of metals are separated by forming salts of the metals which exhibit photoredox activity with an anion selected to provide insoluble salts at one oxidation state and soluble salts at another oxidation state, forming a solution of these salts with a solvent selected to permit a difference in solubility of salts dissolved at different oxidation salts and to be nonreactive with the nonsoluble salts, irradiating the solution with light at a wavelength which changes the oxidation state of the metal ion most susceptive to a change in oxidation state, and separating the insoluble salt formed thereby from the solution.

6 Claims, 2 Drawing Figures

PHOTOCHEMICAL SEPARATION OF METALS IN SOLUTION BY PRECIPITATION FOLLOWING REDUCTION OR OXIDATION

BACKGROUND OF THE INVENTION

The present invention pertains generally to metal separation and in particular metal separation through photo-induced chemistry.

Present techniques for the separation of metals utilize a chemical difference in the metals. Examples of these techniques are fractional crystallization, ion-exchange chromatography, distillation, and solvent extraction. Generally, these techniques are slow and inefficient.

If the metals to be separated are lanthanides or actinides, the techniques are either unworkable or of very limited value. Only two techniques, ion-exchange chromatography and solvent extraction, are used commercially. Both methods are relatively slow and expensive, and require large capital expenditures for specialized equipment and large amounts of chemical reagents. The use of large amounts of reagents present serious disposal and storage problems, if the metals are radioactive, as in the case of nuclear fuel reprocessing which involves large amounts of lanthanides and actinides.

In light of these problems and disadvantages, metal separation by a photochemical method appears promising. To date, photochemical methods have been restricted to separation in the gas phase or in the solid state. Liquid-phase separation is considerably more difficult than separations in the gas phase or in the solid state. It is these problems which have discouraged research in liquid-phase, photochemical separation.

With liquid-phase separations, back reactions by radicals or other species in solution occur. For example, in reduction reaction in solution, the product is re-oxidized by radicals produced by the reaction. An important factor in controlling the undesired back-reaction is the speed of the reaction. Thus it is necessary for the reaction to go to completion much faster than any competing back-reaction. A liquid-phase separation requires a selective change in solubility in order to be successful. Often it is not possible to find a reaction which can produce a product which is sufficiently different in solubility.

Light-induced reactions have further problems, one of which is a lack of information concerning this type of reaction. Generally, light-induced reaction rates are too slow to avoid back-reaction to be practical. Often the wavelength of light needed to produce photo-oxidation also produces photo-reduction. Another difficulty is a lack of spectral selectivity of the reactants, e.g., metallic salts. The charge-transfer bands for most metal ions in solution are broad and overlapping.

There is considerable difficulty with chemical scrambling following photoredox processes, i.e., the product causing a further redox reaction with another species in solution. As a result, the first product is changed back to its original oxidation state and the wrong species changes oxidation states. In a separation process, the net effect of chemical scrambling is that the wrong species is separated or that no species is separated because the solubility of the species with the changed oxidation state did not change.

For those lanthanides and actinides displaying photoredox activity, there are generally only a few oxidation states available, and none of these elements can be photochemically reduced to the metallic state. This feature limits the choices for anions used to produce soluble salts in one oxidation state and insoluble salts in another. Furthermore, the oxidation potentials for a number of lanthanides and actinides are quite large (e.g., 1.55 V for $Sm^{3+}/Sm^{2+}$), which increases the rate of back-reactions and side-reactions due to the greater reactivity of the photochemically produced oxidation state.

SUMMARY OF THE INVENTION

It is, therefore, an object of the present invention to separate actinides and lanthanides (displaying more than one stable oxidation state in solution) in a manner requiring much less equipment and readily adaptable for commercial processing.

Another object of this invention is to separate lanthanides and actinides without the use of large quantities of chemical agents.

A further object of this invention is to separate lanthanides and actinides in the liquid phase by a photochemical technique.

These and other objects are achieved by changing the physical state with a change in oxidation state of a metallic salt displaying redox photochemistry in a mixed metallic salt solution through the absorption of photons in the charge-transfer band.

DETAILED DESCRIPTION OF THE INVENTION

Figure 1:
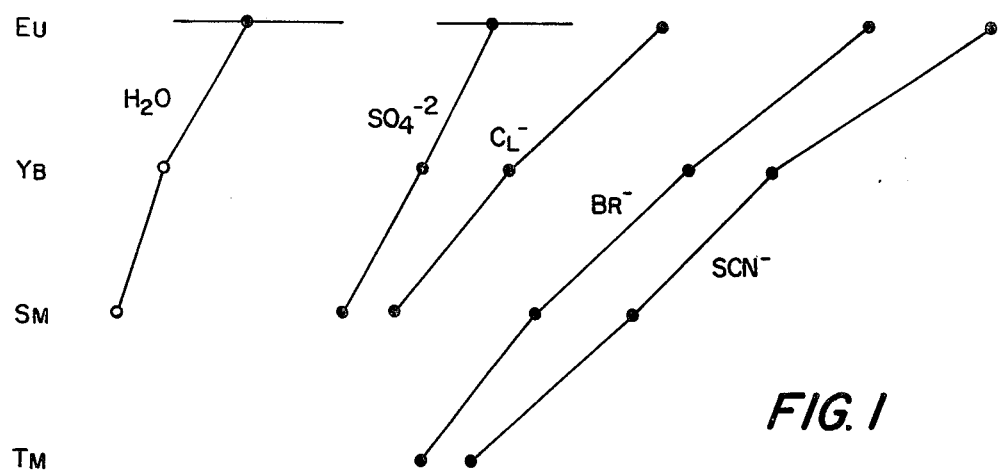
FIG. 1 shows an example of charge-transfer spectra in several lanthanides in the +3 oxidation state.

While the practice of the present invention is useful in separating any metal having an electronic absorption isolated from the bands of the solvent and ions present in solution and displaying redox photochemistry, the importance of this invention is in the separation of lanthanides and actinides. For this reason the mechanism of the present invention is shown using europium as the example. Europium ($Eu^{3+}$) is photoreduced in an aqueous solution of sulfates ($SO_4^{2-}$) of several other lanthanides by absorption in its charge-transfer band and precipitated with sulfate.

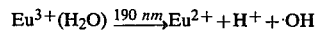

The hydroxyl radicals are removed from solution by a scavenger, e.g., an alcohol, isopropanol.

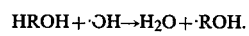

Otherwise, the hydroxyl radical reacts with the reduced europium and oxidizes it back to its original oxidation state. The organic radical formed can cause further reduction of $Eu^{3+}$

If $Eu^{2+}$ is not removed by $SO_4^{2-}$, it can back-react by photolysis in its f-d bands, which leads to photo-oxidation.

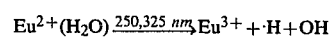

If precipitation does not occur, then a wavelength-dependent photostationary state is formed, in which the oxidation and reduction reaction rates are equal.

The mechanism is described in greater detail in Donohue, Terence, "Laser Induced Separation of the Lanthanides in the Liquid State," in "Lasers in Chemistry," ed. by M. A. West, Elsevier, New York, 1977, p. 216. This reference is hereby incorporated by reference.

If the wavelength chosen is within a charge-transfer band or a f-d band of a metal which does not mostly easily undergo a redox reaction, scrambling occurs. This mechanism is illustrated as follows, using aqueous oxalate ($Ox^{2-} = C_2O_4^{2-}$) complexes of iron and cobalt as an example. $CoOx_3^{3-}$ is more readily reduced than $FeOx_3^{3-}$. The primary reaction is $$CoOx_3^{3-} \xrightarrow{h\nu} CoOx + Ox^{2-} + Ox^{-}.$$

In a mixture of complexes of both iron and cobalt, if the wavelength is chosen so that only $FeOx_3^{3-}$ absorbs light in its charge-transfer band, then the primary process, $$FeOx_3^{3-} \xrightarrow{h\nu} FeOx + Ox^{2-} + Ox^{-},$$

will be followed by a scrambling reaction, $$CoOx_3^{3-} + FeOx \rightarrow FeOx_3^{3-} + CoOx,$$

where the iron complex is returned to its original form and cobalt is precipitated. However, advantage can be taken of this scrambling process. For instance, an element such as cobalt can be removed from solution by using the absorption bands from another element, such as iron, but only if the first species is more readily reducible. This allows a greater freedom in choice of light sources and reaction conditions. Furthermore, the effect of scrambling reactions of this type can be eliminated by photochemically separating metals in order of their ease of reduction.

Which metals have an electronic absorption band sufficiently isolated from the bands of the solvent and ions present in the solution and display redox photochemistry can be determined from standard references, e.g., V. Balzani and V. Carissiti, "*Photochemistry of Coordination Compounds*," N.Y. Academic Press, 1970 and A. W. Adamson and P. D. Fleischauer, editors, "*Concepts of Inorganic Photochemistry*," N.Y. Wiley—Interscience, 1975. An electronic absorption band is sufficiently isolated if the metal absorbs at least twice as much as any other species present, e.g., solvent, anions, and other metals. Preferably, the light absorption should be at least five times greater. If the absorption is less than twice that of any other species present, photons are wasted to an objectionable degree by absorption by other species and unwanted reactions may occur.

From functional considerations, the preferred metals for the practice of the present invention are titanium, vanadium, chromium, manganese, iron, cobalt, copper, niobium, molybdenum, ruthenium, palladium, silver, tungsten, iridium, platinum, gold, mercury, cerium, samarium, europium, thulium, ytterbium, uranium, neptunium, plutonium, berkelium, californium, einsteinium, mendelevium and nobelium. The lanthanides and the actinides are preferred from an economical viewpoint. The most preferred of these metals are cerium, europium, ytterbium, samarium, uranium, neptunium, and plutonium. All of the above metals can be separated from any group of metals.

In certain cases, oxygen ($O_2$) in the atmosphere can react with products (or reagents), causing unwanted oxidation reactions. For instance, this is no problem in the photoreduction of $Co^{3+}$ or $Eu^{3+}$, but is significant in the photoreduction of $Yb^{3+}$ or $UO_2^{2+}$. In the latter cases, $O_2$ must be removed by bubbling an inert gas, such as argon, nitrogen or carbon dioxide, through the solution before photolysis, to displace and remove atmospheric oxygen. The significance of $O_2$ in solutions is further discussed in the references cited above, and can usually be determined from the known oxidation potentials for metals in their various oxidation states or from actually conducting a separation. It should be noted that all separations of the present invention can be conducted in a nonoxidizing atmosphere, and most can be conducted in an oxidizing atmosphere.

Any photon source may be used if the source is capable of operating at the wavelength within the charge-transfer band of the metal to be separated. Examplary of these sources are rare gas halide excimer lasers, such as argon fluoride or krypton fluoride lasers, and resonance lamps, such as low-pressure mercury lamps.

The light may be pulsed or continuous. The photon density (power) of the light does not generally effect the reaction; however, if the density is too low in relation to the metal concentration and solution volume, the speed of reaction is reduced. The wavelength of the light is within a charge-transfer band or any f-d band of the metal that undergoes redox most readily. If that metal has more than one band, then the preferred band is the one producing the least interference with the solvent and ions in solution. Examples of charge-transfer spectra for several lanthanides in the $+3$ oxidation state are given in FIG. 1. The complex from which the electron is transferred is indicated. $H_2O$ and $SO_4^{2-}$ are in aqueous solutions, while $Cl^-$, $Br^-$ and $SCN^-$ complexes are in alcohol solutions. The bars indicate width at half peak intensity.

The physical change most convenient for separation is a change in solubility. Thus the solvent and anion should be such that the metal is in solution before the redox reaction and is precipitated afterwards. Precipitation is enhanced by maintaining the reactant concentrations as close to the solubility limit as possible. Accordingly, it is preferred that the reactant concentrations be maintained at 90% or higher of their maximum solubility limits. Most preferably, the concentration of the reactant are 98% or higher of the maximum limits.

It should be noted that the concentration of the anion can have an effect on the separation factor, $\beta$, which is defined as the ratio of the concentration of the desired metal to the total concentration of metals in the product divided by the same ratio in the reagents. But a reduction in the anion concentration would also reduce the rate of yield. Thus in the usual situation, the concentrations of the metal to be separated and the anion are preferably equal.

Temperature affects the solubility of both reagent and product salts but generally will have no effect upon photoreduction processes and only a small effect upon photooxidation reactions. If, in a particular situation, a change in temperature causes a significant change in solubility of the product salt, the temperature should be changed in the direction that reduces the solubility of the product, within other experimental limitations, such as solvent boiling and freezing points, etc.

To minimize the concentration of radicals produced by the redox reaction, a scavenger is usually necessary. The scavenger to be selected depends on the solvent, the anion and the redox reaction. For example in an aqueous solution in which a reduction is occurring, electrons are taken from water, thereby producing ·OH radicals. On the other hand, if the chosen reaction is a photooxidation in aqueous solution, the electron is donated to $H_2O$, producing H· radicals. In both cases, the radicals could react with the reduced/oxidized species, returning them to their original oxidation state, thus obviating the photochemical reaction. This detrimental back reaction can be avoided by use of a suitable scavenger. The choice of scavenger depends largely on the chemical properties of the radical produced. Simple alcohols, such as methanol, ethanol and isopropanol, are excellent scavengers for both H· and ·OH. If the solvent is in fact an alcohol, no further scavenging agents are required. (see Table 1). In aqueous solution, a scavenger generally must be added, such as isopropanol or an acid such as $HClO_4$ or $H_2SO_4$. Usually, the greater the scavenger concentration, the more effectively radicals can be eliminated, but other considerations, e.g., solubility limitations of the reagents, will limit the allowable maximum scavenger concentration. The choice of scavenger is also limited to those that are largely transparent at the photolysis wavelength chosen and they must not interfere with the primary photoredox reaction.

All the light alkyl alcohols, i.e., alcohols with 5 or fewer carbon atoms, can rapidly scavenge H·, ·OH and Cl· radicals. Of course, the more reactive secondary alcohols can be used for these radicals also. However, in the case of less reactive radicals, such as Br·, only secondary alcohols with no more than five carbon atoms, such as isopropanol or 2-butanol, are effective. Furthermore, I· radicals cannot be readily scavenged at all (except by themselves, by recombining to form $I_2$, which is a relatively slow process) due to their low reactivity. Thus the photochemical reactions employed must be selected so that the radicals created can be readily scavenged.

In view of these principles and experimentations, the following specific examples of present invention have been determined such and are given in Table 1.

Table 1

| example no. | species | oxidation state before photolysis | oxidation state after photolysis | solvent | scavenger | anion |
|---|---|---|---|---|---|---|
| 1 | Eu | 3+ | 2+ | water | isopropanol | $SO_4^{2-}$ |
| 2 | Eu | 3+ | 2+ | ethanol | the solvent | $Cl^-$ |
| 3 | Eu | 3+ | 2+ | isopropanol | the solvent | $Br^-$ |
| 4 | Ce, Bk | 3+ | 4+ | water | acid($H^+$), such as $HClO_4$, $H_2SO_4$ | $PO_4^{3-}$, $IO_3^-$ |
| 5 | Yb | 3+ | 2+ | 2-butanol | the solvent | $Cl^-$ |
| 6 | U, Np, Pu | 3+ | 4+ | water | acid | $IO\ 3^-$, $PO_4^-$ |
| 7 | U, Np | 6+ | 4+ | water | isopropanol | $IO_3^-$ |
| 8 | Fe, Co, Mn | 3+ | 2+ | water | none | oxalate |
| 9 | Hg | 2+ | 1+ | ethanol | the solvent | $Cl^-$, $Br^-$ |

The parameters for some of the photon sources which could be used are given in Table 2.

Table 2

| example no. | source | wavelength (nm) | typical ave. power levels (W) |
|---|---|---|---|
| 1. | Hg lamp | 185 | .001 |
|  | ArF laser | 193 | .01–.10 |

Table 2-continued

| example no. | source | wavelength (nm) | typical ave. power levels (W) |
|---|---|---|---|
| 2. | Hg lamp | 254 | .10 |
|  | KrF laser | 249 | .1–1.0 |
| 3. | Krf laser | 249 | .1–1.0 |
|  | XeCl laser | 308 | .05–.10 |
| 4. (Ce) | Hg lamp | 254 | 0.10 |
| 5. | Hg lamp | 254 | 0.10 |
| 6. | XeF laser | 351 | .1–1.0 |
|  | Hg lamp | 366 | 1.–10 |
| 7. | XeCl laser | 308 | .05–.10 |
|  | tungsten lamp (filtered) | 300 | .1–10. |
| 8. (Co) | $Ar^+$ laser | 488.0 | 0.5–5.0 |
| (Fe) | $N_2$ laser | 337.1 | .01–.10 |
| 9. | (same as 2) | | |

A major advantage of the present invention is that it is capable of continuous operation. A mixture of metals are introduced into solutions having a suitable concentration of a scavenger and of an anion which was selected on the basis of its complexing power to the mixture of metals at a certain oxidation state and of its precipitation power to one or more of the metals at another oxidation state. The solution moves past a photon source which irradiates the solution with light at a wavelength within the charge-transfer band of the metal most easily redoxed. The precipitate thus formed is removed by mechanical means while the solution proceeds for further photoredoxing or other processing.

The general nature of the invention have been set forth, the following examples are presented as specific illustrations of the practice thereof. It is understood that the invention is not limited to these examples, but is susceptible to different modifications that would be recognized by one of ordinary skill in the art.

In the example, binary or ternary combinations of equimolar mixtures (0.1 M) of lanthanide perchlorates and 0.05 M potassium sulfate were prepared in water. Isopropanol was added to serve as scavenger, where a 10% concentration was used. The precipitates formed following photolysis were washed, centrifuged, and dissolved in concentrated nitric acid for spectrophotometric analysis. Two other series of experiments used either ethanol or isopropanol, instead of water, as the solvent. The resulting precipitates were treated as those from the aqueous solutions, except for being washed in the appropriate alcohol. The photochemical results were compared with conventional chemical reduction methods by performing separation experiments with a Jones reductor (Zn amalgam) according to the technique disclosed in H. N. McCoy, J. Am. Chem. Soc. 57, 1757 (1935).

The photon sources included several rare-gas-halide discharge-pumped excimer lasers (ArF at 193 nm and KrF at 249 nm) and resonance lines from low-pressure mercury lamps (185 and 254 nm). The photoredox reactions were continued to near completion (90–99%). The separation factors, $\beta$, $$(\text{the ratio of } \frac{[\text{Eu/Ln}] \text{ final}}{[\text{Eu/Ln}] \text{ initial}})$$

were determined from spectrophotometric data, using the appropriate f-f transitions for the various lanthanides.

Figure 2:
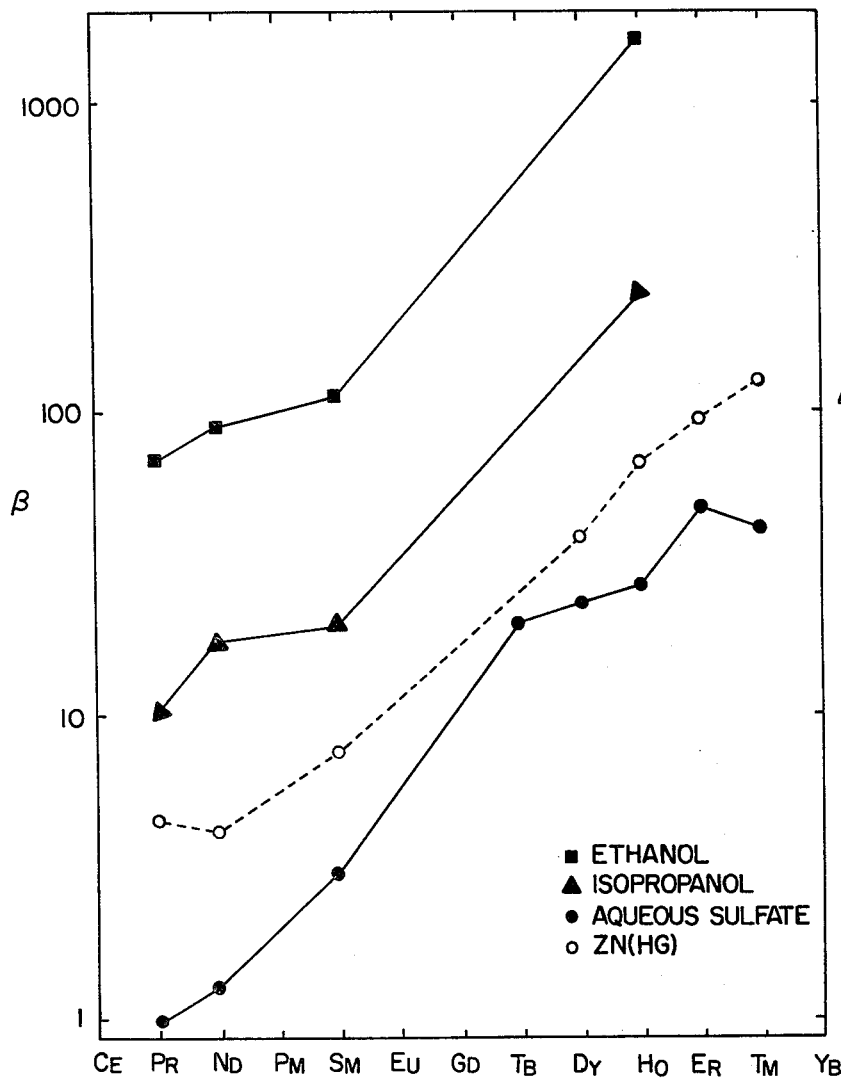
FIG. 2 shows separation factors for binary Eu/Ln mixtures.

The results and comparison are summarized in FIG. 2. In all cases, $\beta$ steadily increased across the rare earth series. A possible explanation of the trend is the lanthanide contraction e.g., the $Eu^{2+}$ ion is larger than the $Eu^{3+}$ ion. Due to their similar radii, the lighter and larger $Ln^{3+}$ ions have a greater tendency to coprecipitate with $EuSO_4$ or $EuCl_2$, which would account for the trend shown in FIG. 1.

The comparison shown in FIG. 2 demonstrates the excellent results obtainable with the practice of the present invention. The chemical separation selected is one of the best techniques available, but the present invention either greatly exceeded or was comparable to that method. Since the subject method does not have the disadvantages of a chemical separation, e.g., the possibility of producing large quantities of radioactive reagents, the worst example shown in FIG. 2 is preferably over a chemical separation.

The results, procedure, and discussion of these experiments are presented in more detail in Donohue, Terence, "*Photochemical Separation of Europium from Lanthanide Mixtures in Aqueous Solution,*" in J. Chem. Phys. 67(11), (1977), p. 5402, and in Donohue, Terence (nf. earlier). Both references are incorporated herein by reference.

A similar experiment was conducted with an iron-cobalt separation using an argon laser, a nitrogen laser, and a mercury lamp as photon sources. One milliliter samples, 0.025 M in each of the trisoxalato complexes of iron and cobalt and 0.05 M in aqueous $H_2SO_4$ were used. The products formed FeOx and CoOx were sufficiently stable that no scavenger for radicals was required. The separation factors $$(\beta = \frac{[\text{Fe/Co}] \text{ final}}{[\text{Fe/Co}] \text{ initial}})$$

depended heavily upon the wavelength employed. The results and discussion are given in more detail in Donohue, Terence, "*Photochemical Separation of Metals in Aqueous Solution,*" in Chem. Phys. Lts. 48 (1): p 119–121, (1977). This reference is also hereby incorporated by reference.

Obviously many modifications and variations of the present invention are possible in light of the above teachings. It is therefore to be understood that within the scope of the appended claims the invention may be practiced otherwise than as specifically described.

What is claimed and desired to be secured by Letters Patent of the United States is:

1. A method for separating a metal from solution by a redox reaction which comprises:
   providing a mixture of metals, some of which exhibit photoredox activity;
   forming salts of said metals with an anion selected to provide an insoluble salt at one oxidation state and a soluble salt at another oxidation state for those metals with photoredox activity;
   forming a solution of said salts with a solvent selected to permit a difference in solubility of salts dissolved therein at different oxidation states and to be nonreactive with said nonsoluble salt formed by said change in oxidation state;
   providing a scavenging agent for radical formed during a redox reaction;
   irradiating said solution with light having a wavelength which changes the oxidation state of the salt most susceptible to a change in oxidation state; and
   separating the insoluble salt formed thereby from the solution.

2. The method of claim 1 wherein said mixture of metals includes a lanthanide selected from the class consisting of lanthanum, cerium, praseodymium, neodymium, promethium, samarium, europium, gadolinium, terbium, dysprosium, holmium, erbium, thulium, ytterbium.

3. The method of claim 1 wherein said mixture of metals includes an actinide selected from the class actinum, thorium, protactinium, uranium, neptunium, plutonium, americium, curium, berkelium, californium, einsteinium, fermium, mendelevium, nobelium, lawrencium.

4. The method of claim 3 wherein said mixture of metals include europium and ytterbium, said solvent is an alcohol selected from the class consisting of methanol, ethanol, and isopropanol, and said scavenger is said solvent.

5. The method of claim 4 wherein said radiation is from a KrF laser at a power level from 0.1 to 1.0 watts.

6. The method of claim 1 wherein said mixture of metals includes iron, cobalt, manganese, and mercury.

* * * * *